(12) United States Patent
Patch et al.

(10) Patent No.: US 11,320,069 B2
(45) Date of Patent: May 3, 2022

(54) THREADED COUPLING WITH UNDER-TORQUE PREVENTION

(71) Applicant: Parker-Hannifin Corporation, Cleveland, OH (US)

(72) Inventors: Jason D. Patch, Columbus, OH (US); Nathan L. Green, Galloway, OH (US); Le Yu, Dublin, OH (US); Scott A. Vinson, Fairfield, OH (US); Diane M. Artman, Columbus, OH (US); George C. Reichert, IV, Hilliard, OH (US); Phillip A. Landis, Hilliard, OH (US); Theodore T. Amling, Upper Arlington, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 16/897,336

(22) Filed: Jun. 10, 2020

(65) Prior Publication Data

US 2021/0025524 A1    Jan. 28, 2021

Related U.S. Application Data

(60) Provisional application No. 62/876,908, filed on Jul. 22, 2019.

(51) Int. Cl.
*F16L 15/08* (2006.01)
*F16L 15/00* (2006.01)

(52) U.S. Cl.
CPC ............. *F16L 15/08* (2013.01); *F16L 15/006* (2013.01)

(58) Field of Classification Search
CPC ...... F16L 19/025; F16L 15/08; F16L 2201/10
See application file for complete search history.

(56) References Cited

U.S. PATENT DOCUMENTS

| 3,898,163 A | 8/1975 | Mott |
| 5,192,095 A * | 3/1993 | Behrens ............. F16L 19/0212 |
| | | 285/332.1 |

(Continued)

FOREIGN PATENT DOCUMENTS

| EP | 1555473 | 8/2006 |
| JP | 4167657 B2 | 10/2008 |
| WO | 2003052311 A1 | 6/2003 |

OTHER PUBLICATIONS

Geberit Mapress Stainless Steel, available as of Jun. 8, 2020; https://www.international.geberit.com/products/piping-systems-supply/geberit-mapress-stainless-steel-pipes-fittings/.

(Continued)

*Primary Examiner* — David Bochna
(74) *Attorney, Agent, or Firm* — Renner, Otto, Boisselle & Sklar, LLP

(57) ABSTRACT

A threaded coupling for ensuring a complete connection between fluid conduits includes a body portion of a fluid conduit, an axially forward sealing surface, a thread, and an interference member. The interference member is disposed on the body portion and is engageable with a portion of another fluid conduit to apply a load on the interference member when the fluid conduits are threadably connected together. The interference member is configured to prevent a complete sealing engagement between the fluid conduits when the load on the interference member is less than a predefined amount, and is configured to allow the complete sealing engagement between the fluid conduits when the load on the interference member meets or exceeds the predetermined amount.

11 Claims, 5 Drawing Sheets

(56) References Cited

U.S. PATENT DOCUMENTS

| | | |
|---|---|---|
| 5,516,156 A | 5/1996 | Williamson |
| 6,581,983 B1 | 6/2003 | Viegener |
| 7,475,918 B2 | 1/2009 | Kaimer |
| 7,823,932 B2 | 11/2010 | Webb |
| 8,052,177 B2 | 11/2011 | Irwin |
| 10,036,494 B2 | 7/2018 | Bancroft |
| 2004/0094959 A1* | 5/2004 | Shemtov ............. F16L 27/1008 285/354 |
| 2005/0097763 A1* | 5/2005 | Williams .............. F16L 19/103 33/501.45 |
| 2006/0012173 A1* | 1/2006 | Pinckney .............. F16L 15/006 285/386 |
| 2008/0036210 A1* | 2/2008 | Pinckney ................ F16B 39/28 285/386 |
| 2009/0289452 A1* | 11/2009 | Bennett ................ F16L 19/103 285/339 |
| 2010/0025992 A1 | 2/2010 | Spence |
| 2012/0043757 A1* | 2/2012 | Williams .............. F16L 19/045 285/339 |
| 2015/0108721 A1 | 4/2015 | Thuillier |
| 2015/0323110 A1* | 11/2015 | Trivett .................... F16L 15/08 285/389 |
| 2016/0091126 A1* | 3/2016 | Gibson .................. F16L 19/12 285/382 |
| 2016/0238167 A1* | 8/2016 | Hartmann ............. F16L 13/142 |
| 2017/0276270 A1* | 9/2017 | Brown .................. F16L 19/103 |
| 2020/0025314 A1* | 1/2020 | Pattison, II ......... F16L 19/0218 |
| 2021/0317933 A1* | 10/2021 | Trivett .................. F16L 19/041 |

OTHER PUBLICATIONS

Eurotubi Pressfitting System; LBP (Leak Before Press) O-ring: a new quality standard; published Jul. 30, 2012.

Pegler Yorkshire; Copper XPress; The Press-fit Jointing System; Brochure, published Aug. 16, 2007.

VSH connects; XPress Technical manual; published 2014.

\* cited by examiner

THREADED COUPLING WITH UNDER-TORQUE PREVENTION

RELATED APPLICATIONS

This application claims the benefit of U.S. Provisional Application No. 62/876,908 filed Jul. 22, 2019, which is hereby incorporated herein by reference in its entirety.

FIELD OF INVENTION

The present invention relates generally to threaded couplings for interconnecting fluid-carrying conduits, and more particularly to such assemblies having a mechanism that prevents under-tightening of the connection between the fluid conduits for indicating a complete connection.

BACKGROUND

Threaded couplings are employed to connect adjacent sections of pipes, tubing, fluid flow equipment and the like in a variety of industries and applications. For such couplings to work properly with a leak-free connection, the appropriate amount of tightness or torque is required to tighten the threaded coupling.

Traditionally, to achieve the correct tightness, the couplings are lubricated properly and a corresponding torque load is applied. A torque wrench is normally used to monitor the amount of torque applied. Once the desired torque is reached, the coupling is typically marked as complete using a pen or marker. However, the marking can be wrong due to operator errors, or may be erased by subsequent processes, leading to incorrect indication. Sometimes there are occurrences in which an operator only hand-tightens the coupling, which can pass initial inspection without leakage, but when such a hand-tightened coupling is used in the field under normal operating pressures and cyclical loading, it will begin to leak.

SUMMARY OF INVENTION

There is a need in the art, therefore, for an improved threaded coupling that aids in quality assurance to ensure that a proper connection of the coupling has been made. The present invention provides such a threaded coupling, which is configured to prevent adequate sealing between fluid conduit members at the coupling joint, thereby intentionally causing a leak, such as during initial inspection, if the load applied when making the connection was below a predefined amount.

According to an aspect of the invention, a threaded coupling for ensuring a complete connection between fluid conduits includes: a body portion of a fluid conduit, an axially forward sealing surface, a thread, and an interference member operatively coupled to the body portion, the interference member being engageable with a portion of another fluid conduit to apply a load on the interference member when the fluid conduits are threadably connected together; wherein the interference member is configured to prevent a complete sealing engagement between the fluid conduits when the load on the interference member is less than a predefined amount; and wherein the interference member is configured to allow the complete sealing engagement between the fluid conduits when the load on the interference member meets or exceeds the predetermined amount.

According to an aspect, the interference member includes an annular sleeve. The annular sleeve may be frictionally held to the body portion. When the load on the sleeve meets or exceeds the predefined amount, a friction force between the sleeve and the body portion is overcome to allow the sleeve to move relative to the body portion to allow the complete sealing engagement between the fluid conduits. The sleeve may be disposed in the body portion with an interference fit, and the predefined load may include the force for causing elastic and/or plastic deformation of the body portion by the sleeve to allow the sleeve to move relative to the body portion.

According to another aspect, the interference member includes one or more pins. The pins may be frictionally held to the body portion. When the load on the pins meets or exceeds the predefined amount, a friction force between the pins and the body portion is overcome to allow the pins to move relative to the body portion to allow the complete sealing engagement between the fluid conduits. The pins may be disposed in the body portion with an interference fit, and the predefined load may include the force for causing elastic and/or plastic deformation of the body portion by the pins to allow the pins to move relative to the body portion.

According to another aspect, the interference member includes a biasing member having a predefined spring force which allows the biasing member to move or deflect relative to the body portion by a predetermined amount in response to the load on the biasing member. When the load on the biasing member meets or exceeds the predefined amount, a spring force of the biasing member is overcome to allow the complete sealing engagement between the fluid conduits.

According to another aspect, the interference member includes a stop on the threads. When the load on the stop meets or exceeds the predefined amount, a shear force displaces the stop from the threads, thereby allowing the complete sealing engagement between the fluid conduits.

According to another aspect, the interference member includes a pressure sensitive material. The pressure sensitive material may dissolve when the load on the pressure sensitive material meets or exceeds the predefined amount, thereby allowing the complete sealing engagement between the fluid conduits.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

DETAILED DESCRIPTION

Figure 1:
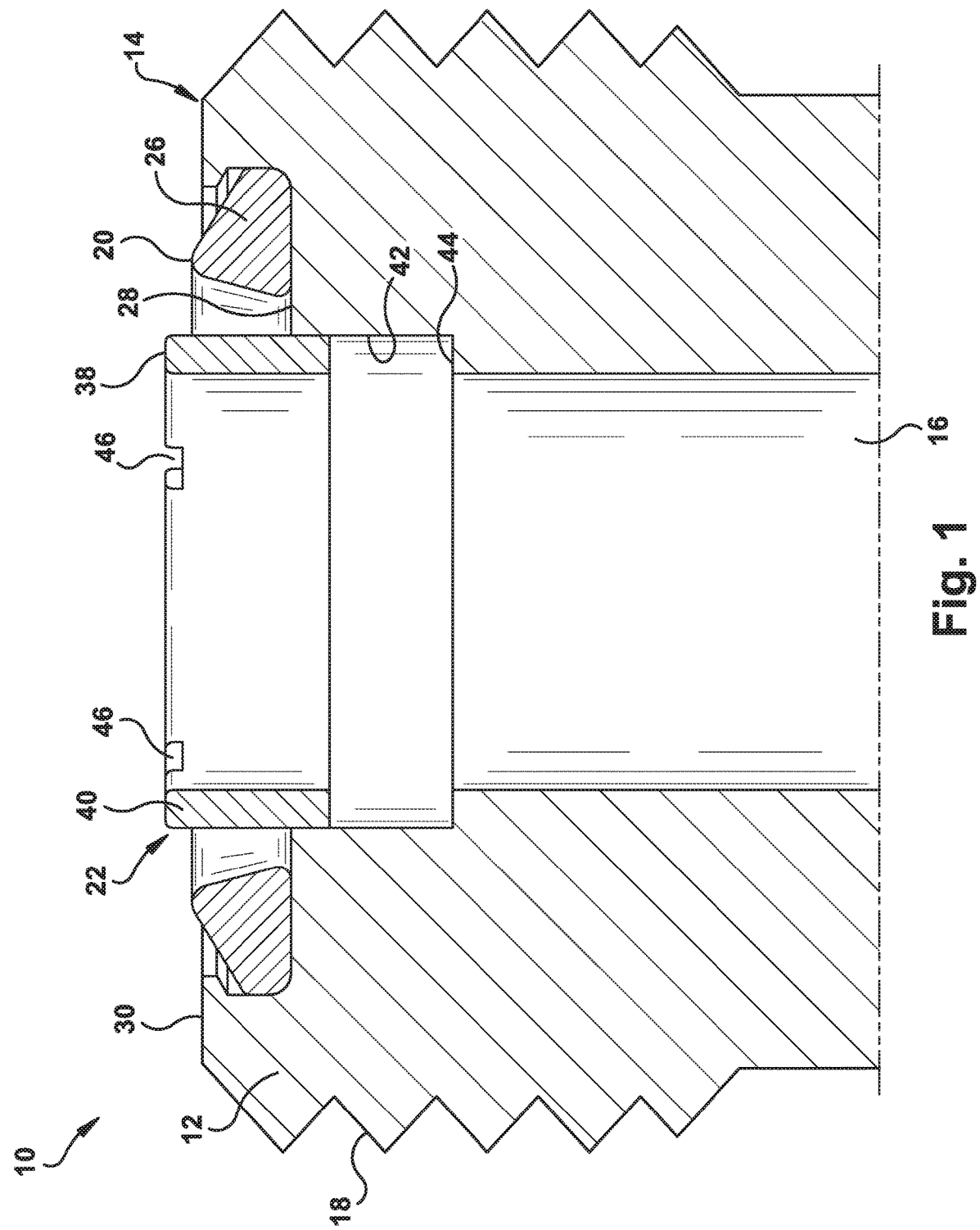
FIG. 1 is a cross-sectional side view of at least a portion of an exemplary threaded coupling according to an embodiment of the invention.

Embodiments of the present invention will now be described with reference to the drawings, wherein like reference numerals are used to refer to like elements throughout. It will be understood that the figures are not necessarily to scale.

According to an aspect of the invention, a threaded coupling is provided for ensuring a complete connection between fluid conduits. The threaded coupling includes a body portion of a fluid conduit, an axially forward sealing surface, a thread, and at least one interference member. The interference member is operatively coupled to the body portion and is engageable with a portion of another fluid conduit to apply a load on the interference member when the fluid conduits are threadably connected together. The interference member is configured to prevent a complete sealing engagement between the fluid conduits when the load on the interference member is less than a predefined amount. The interference member is configured to allow the complete sealing engagement between the fluid conduits when the load on the interference member meets or exceeds the predetermined amount. In this manner, the threaded coupling is configured to prevent adequate sealing between the fluid conduits at the coupling joint, thereby intentionally causing a leak, such as during initial inspection, if the load applied when making the connection was below the predefined amount.

Generally, the amount of load applied to the threaded coupling to achieve the complete connection is in accordance with a prescribed tightness or torque requirement, which may depend on the configuration of the threaded coupling and operating conditions, including the size of the conduits, pressures involved, and the like. Generally, the predefined amount of load for achieving a complete connection of the threaded coupling should be greater than that which is achievable by hand-tightening the threaded coupling. Rather, the amount of load to achieve the complete connection should be achievable with a wrench or other torque tool. This should prevent the threaded coupling from passing initial maintenance or quality assurance inspection when only in a hand-tightened state, because such a hand-tightened coupling that is tightened with a load below the predefined amount will begin to leak. On the other hand, such a coupling that has been tightened with a load that meets or exceeds the predefined amount and is in a state of complete connection should provide a leak-free connection not only upon initial inspection, but also at full operational pressures and under cyclical loading conditions as used in the field.

As noted above, the threaded coupling generally will be tightened by applying a torque during the threadable connection of the coupling. Accordingly, the load on the interference member may include a component of force from the torque load. In exemplary embodiments, the torque load to make a complete connection of the coupling may be in the range from 15 ft-lbs to 400 ft-lbs, depending on the coupling size, which should be greater than hand-tight. The load on the interference member that permits or restricts the complete connection of the coupling depending on the amount may be an axial load, such as a compressive load, exerted on the interference member. The axial load may be a component of the force caused by torqueing during the threadable connection, or the axial load may be provided in some other way. In exemplary embodiments, the predefined amount of axial load on the interference member to achieve the complete connection may be in the range from 100 lbf to 1000 lbf, depending on the coupling size.

The interference member may be operatively coupled to the body portion of the fluid conduit in a variety of ways, and the predefined amount of load on the interference member may be sufficient to move, deflect, distort or otherwise change the state of the interference member to enable the complete connection. Generally, the interference member may be specifically designed and/or operatively coupled to the body portion to require a load that is equivalent to the desired tightness force required to make a complete (e.g., leak-free) connection between the fluid conduit members, which may depend on the type, size, operating conditions etc. of the coupling. For example, as described in the exemplary embodiments below, when the load on the interference member meets or exceeds the predefined amount, a friction force between the interference member and the body portion may be overcome to allow the interference member to move relative to the body portion by a sufficient amount to allow the complete sealing engagement (e.g., complete connection) between the fluid conduits. Alternatively or additionally, when the load on the interference member meets or exceeds the predefined amount, a spring force of the interference member may be overcome to allow the interference member to move relative to the body portion by a sufficient amount to allow the complete connection. Alternatively or additionally, when the load on the interference member meets or exceeds the predefined amount, a shear force may displace the interference member relative to the body by a sufficient amount, thereby allowing the complete connection. Alternatively or additionally, when the load on the interference member meets or exceeds the predefined amount, the load on the interference member may cause the interference member to change states thereby allowing the complete connection. The following description and corresponding figures set forth certain illustrative embodiments according to the invention. These embodiments are indicative, however, of but a few of the various ways in which the principles of the invention may be employed, as would be understood by those having ordinary skill int eh art.

Figure 2:
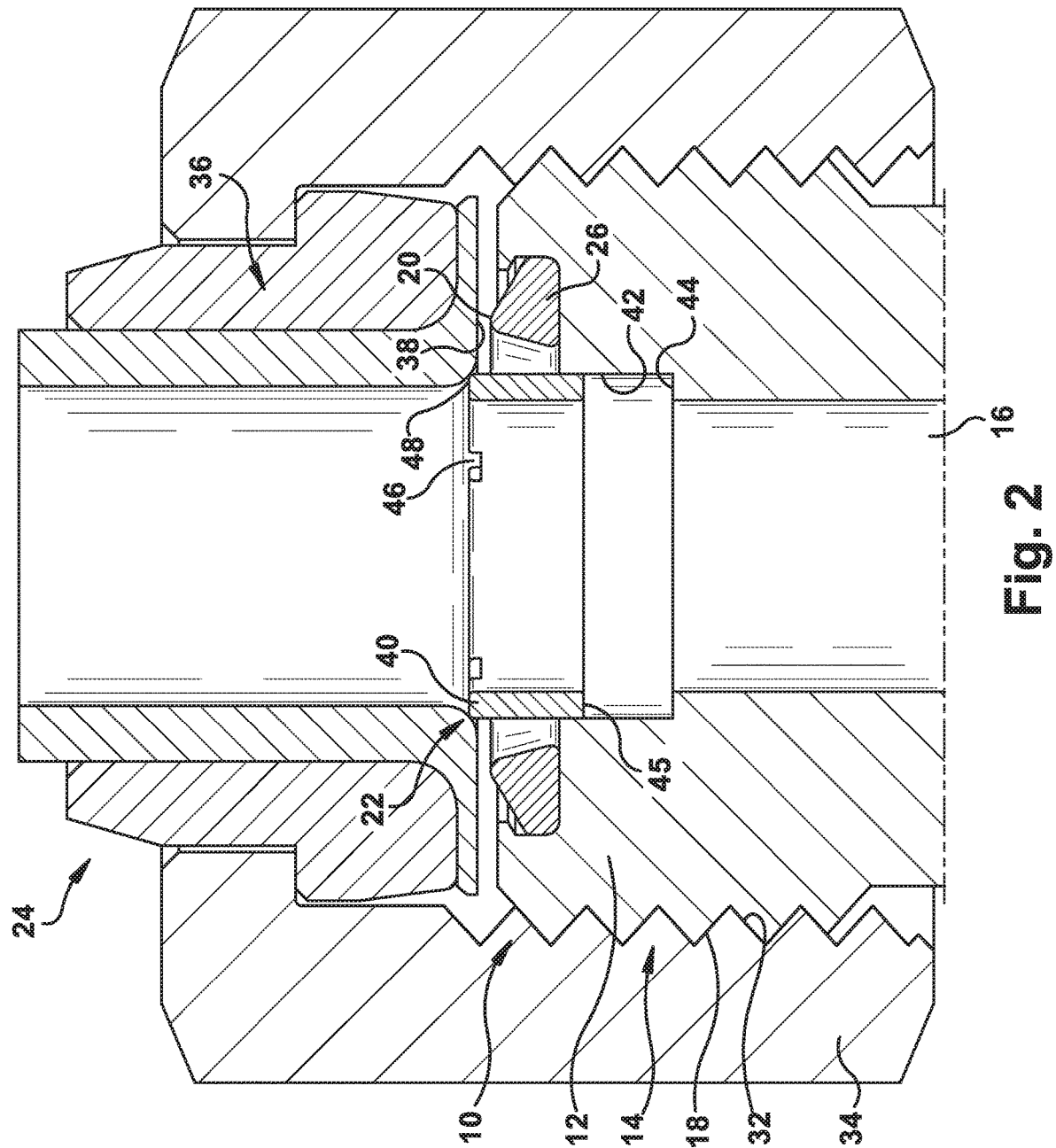
FIG. 2 is a cross-sectional side view of the threaded coupling connected to another fluid conduit, which are shown in an exemplary incomplete state of connection.
Figure 3:
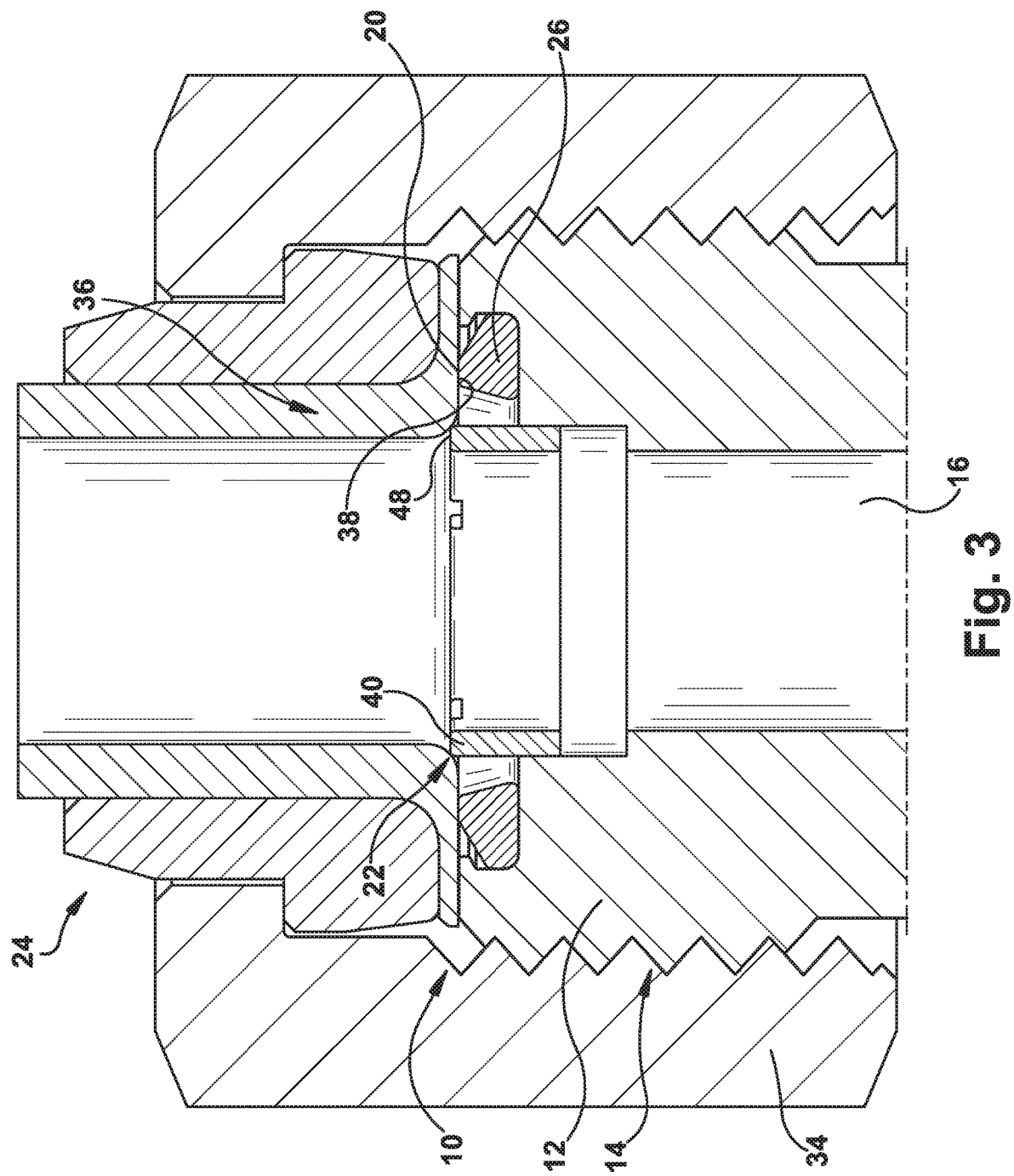
FIG. 3 is a cross-sectional side view of the threaded coupling connected to the other fluid conduit, which are shown in an exemplary complete state of connection.

Referring to FIGS. 1-3, an exemplary threaded coupling 10 is shown. The threaded coupling 10 includes a body portion 12 of a fluid conduit 14 having an internal fluid passage 16 for conveying fluid (e.g., liquid or gas). The threaded coupling 10 also includes threads 18 and an axially forward sealing surface 20. The threaded coupling 10 also includes an interference member 22 disposed on the body portion 12. As described in further detail below, the interference member 22 is engageable with a portion of another fluid conduit 24 to apply a load on the interference member 22 when the fluid conduits 14, 24 are threadably connected together. The interference member 22 is configured to prevent a complete sealing engagement between the fluid conduits 14, 24 when the load on the interference member 22 is less than a predefined amount, and is configured to allow the complete sealing engagement between the fluid conduits 14, 24 when the load on the interference member 22 meets or exceeds the predetermined amount.

In the illustrated embodiment, the body portion 12 is a portion of a fitting that forms at least a portion of the fluid conduit 14. The fitting (also referred to with reference numeral 14) may be any suitable fitting, such as a connector that connects segments of other fluid conduits. As shown, the sealing surface 20 of the coupling 10 includes a seal 26, such as an elastomeric seal, disposed in an annular groove 28 in an end face 30 of the body portion 12. The threads 18 of the fitting are radially outward threads that are configured to threadably couple with an internal thread 32 of a coupling nut 34 (as shown in FIGS. 2 and 3, for example). As discussed in further detail below, the coupling nut 34 may be disposed on a tube end 36 of the other fluid conduit 24 for forceably drawing the tube end 36 toward the fitting 14 during threading for securing the tube end 36 to the fitting 14 in a sealing relationship via the sealing surface 20 of the coupling 10 and a corresponding sealing surface 38 of the tube end 36.

In exemplary embodiments, the interference member 22 is movable relative to the body portion 12 when the load on the interference member 22 meets or exceeds the predefined amount. The interference member 22 may include, or form, an axially forwardly protruding abutment 38, or abutment surface, that protrudes forwardly of the sealing surface 20 when the load on the abutment is below the predefined amount (as shown in FIG. 2, for example), and when the load on the abutment 38 meets or exceeds the predefined amount, the abutment 38 is moved axially rearwardly of the sealing surface 20 (as shown in FIG. 3, for example).

In the illustrated embodiment, the interference member 22 includes an annular sleeve 40. As shown, the annular sleeve 40 may be disposed in the internal fluid passage 16 of the body portion 12 of the coupling 10. For example, the internal fluid passage 16 may include a radially enlarged forward portion 42. The annular sleeve 40 may be disposed in the radially enlarged portion 42. As shown, the radially enlarged portion 42 may have an axial stop surface 44 for restricting movement of the sleeve 40. In some embodiments, the annular sleeve 40 may be cylindrical and fully encompass its longitudinal axis. In other embodiments, the annular sleeve 40 may have a longitudinal split, such as a C-shaped sleeve, which may be lower cost and may be more easily insertable or removable during manufacturing.

In exemplary embodiments, the interference member 22 (e.g., sleeve 40) is frictionally held to the body portion 12, such as by the radially inward walls of the fluid passage 16 (e.g., enlarged portion 42). When the load on the interference member 22 meets or exceeds the predefined amount, a friction force between the interference member 22 and the body portion 12 is overcome to allow the interference member 22 to move relative to the body portion 12, thus allowing the complete sealing engagement between the fluid conduits 14, 24. In the illustrated embodiment, the interference member 22 (e.g., sleeve 40) is disposed within the body portion 12 (e.g., radially enlarged portion 42) with an interference fit, and the movement of the interference member 22 relative to the body portion 12 causes elastic and/or plastic deformation of the body portion 12 (e.g., the internal surface of the enlarged portion 42) by the interference member 22.

In some embodiments, a biasing member (not shown), such as a spring, may be disposed in the radially enlarged portion 42 to engage the axial stop surface 44 and a rearward surface 45 of the interference member (e.g., sleeve 40). The biasing member would allow the interference member 40 to be returned back to the state corresponding to incomplete connection (e.g., protruding forwardly from end face 30), thus allowing the coupling 10 to be reusable. In such an embodiment, the biasing force provided by the biasing member would need to be overcome (alternatively or additionally to other forces—e.g., friction forces) to provide the complete sealing engagement between the fluid conduits 14, 24.

In some embodiments, the sealing surface 20 (e.g., seal 26) may be attached to the interference member 40 (e.g., sleeve) instead of the annular groove 28 in the end face 30 of the body portion 12. Such a configuration may improve assembly time and reduce the number of components. The sealing surface 20 may be over-molded onto the interference member 40, attached with an adhesive, set into a groove, or may be coupled to the interference member 40 in any other suitable manner.

As shown, the interference member 22 (e.g., sleeve 40) also may include a plurality of circumferentially spaced apart gaps 46 that provide a leak path when the interference member 22 engages the opposing fluid conduit 24, and the load is below the predefined amount, such that the threaded coupling is in an incomplete connection state. In the illustrated embodiment, for example, the annular sleeve 40 has a crenulated forward surface forming the gaps 46 for providing such leak paths.

Referring particularly to FIGS. 2 and 3, an exemplary operation of the threaded coupling 10 is shown and described in further detail. FIG. 2 illustrates an incomplete state of connection between the threaded coupling 10 having conduit 14 (e.g., fitting 14) and the other fluid conduit 24 having tube end 36. FIG. 3 illustrates a complete state of connection between the fitting 14 and the other fluid conduit 24.

Referring to FIG. 2, the fitting 14 is in an incomplete state of connection with the other fluid conduit 24. As shown in the illustrated embodiment, the nut 34 may be threaded onto the fitting 14 such that the interference member 22 and a forwardly facing surface 48 of the tube end 36 make contact, however the seal 26 does not engage, or is not compressed sufficiently, to provide a seal-tight engagement with the sealing surface 38 of the conduit 24. This especially is the case when the fluid conduits 14, 24 are utilized at full operating pressures and/or under cyclical load conditions. Such an incomplete state of connection may be achieved with a hand-tight amount of tightness applied to the connection.

The interference member 22 (e.g., annular sleeve 40) may be selected and operatively coupled to the body portion 12 such that the axial load required for moving the interference member 22 is beyond what a hand-tight state can apply via torqueing of the nut 34. In exemplary embodiments, a friction force holds the interference member 22 relative to the body portion 12, and this friction force must be overcome to allow the interference member 22 to move relative to the body portion 12 to allow the complete sealing engagement between the fluid conduits 14, 24. More particularly, in the illustrated embodiment the interference member 22 is disposed within the body portion 12 with an interference fit, and the force required to move the interference member 22 relative to the body portion 12 must be sufficient to cause elastic and/or plastic deformation of the body portion 12 engaging the interference member 22. As such, during hand-tightening, the interference member 22 will not move by very much, if at all, thereby preventing the tube end 36 from being fully drawn into a seal-tight engagement with the fitting 14 via sealing surfaces 20, 38. Thus, when fluid pressure is applied to the coupling joint in the hand-tight state, the connection will intentionally begin to leak. The gaps 46 provided by the interference member 22 may further ensure such leakage by providing leak paths across the interference member's engagement with the tube end 36.

Referring now to FIG. 3, as the coupling nut 34 is further threadably rotated onto the threads 18 of fitting 14, the sealing surface 38 of the tube end 36 is forceably drawn into a complete sealing engagement with the sealing surface 20 (e.g., elastomeric seal 26) of the fitting 14. In this state of complete connection, the sealing engagement between the tube end 36 and the fitting 14 provides a leak-free connection not only upon initial inspection, but also at full operational pressures and under cyclical loading conditions as used in the field.

To achieve such a complete connection, the operator applies a sufficient torque to the coupling nut 34, such as via a wrench or other tool, that causes the nut 34 to advance forwardly relative to the fitting body 12. During such torqueing of the nut 34 via the respective threads 18, 32, an axial component of force is applied by the forwardly facing surface 48 of the tube end 36 to the interference member 22. When the axial force overcomes the friction force holding the interference member 22, or the force for causing elastic and/or plastic deformation of the body portion 12, the interference member 22 will begin to move axially rearwardly within the enlarged portion 42 of the fluid passage 16. During such movement of the interference member 22, the tube end 36 continues to be forceably drawn into engagement with the fitting 14 via the applied load on the nut 34. When the interference member 22 is moved by a predetermined amount (e.g., sufficiently rearward of the sealings surface 20) in response to the axial load applied, the sealing surface 38 of the tube end 36 makes a complete sealing engagement with the sealing surface 20 of the coupling 10 (e.g., via sufficient compression of the elastomeric seal 26 in the fitting 14).

The interference member 22 may be specifically designed and/or operatively coupled to the body portion 12 in a manner to be displaced by a predetermined amount in response to the axial load applied to it during the torqueing of the nut 34. In this manner, the interference member 22 may be designed to require a load that is equivalent to the desired tightness force required to make a complete (e.g., leak-free) connection between the fluid conduit members 14, 24. The interference member 22 may be specifically designed and/or calibrated for each coupling 10 type, size, operational conditions, etc., so as to consistently provide the load required.

Figure 4:
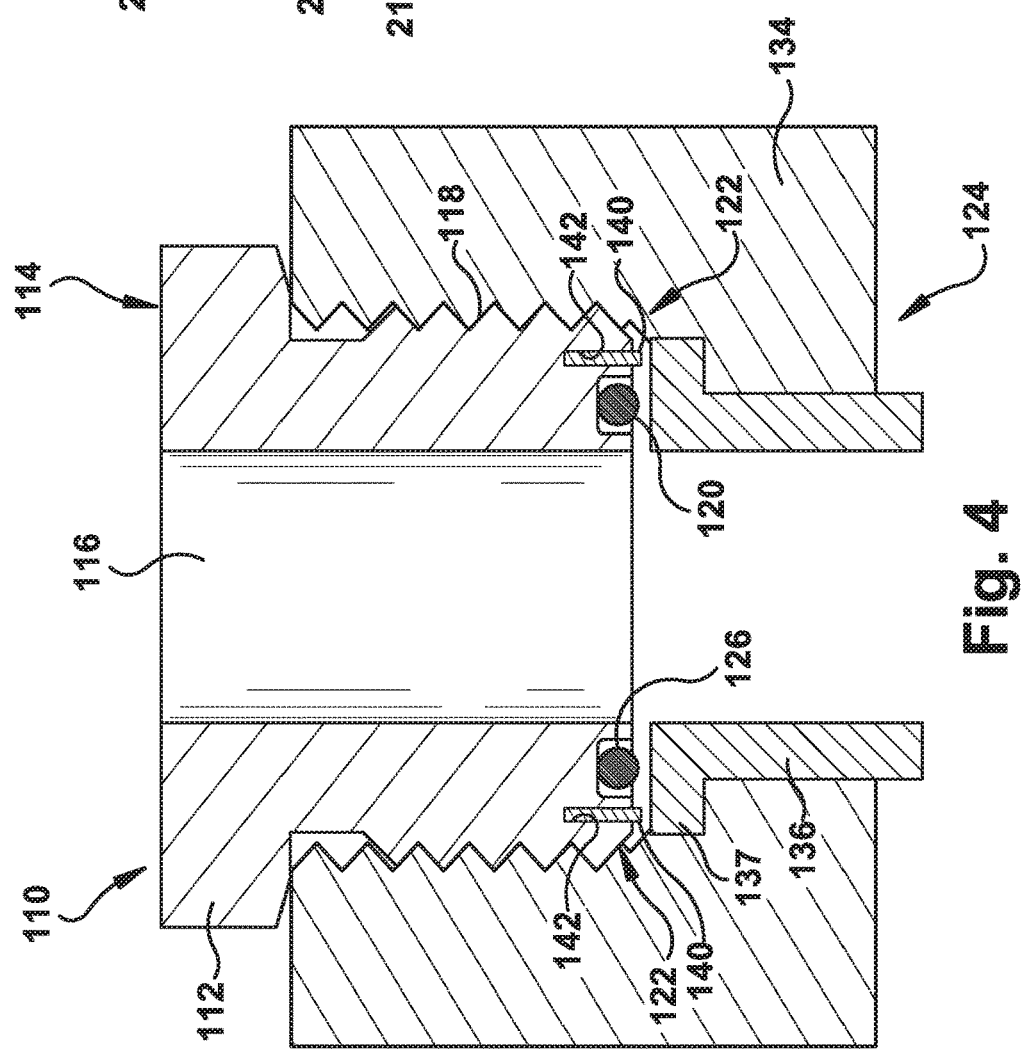
FIG. 4 is a cross-sectional side view of at least a portion of another exemplary threaded coupling according to another embodiment of the invention, which is shown connected another fluid conduit.

Referring to FIG. 4, another exemplary threaded coupling 110 is shown. The coupling 110 is substantially similar to the above-referenced coupling 10, and consequently the same reference numerals but indexed by 100 are used to denote structures corresponding to similar structures in the couplings. In addition, the foregoing description of the structures and operation of the coupling 10 is equally applicable to the coupling 110 except as noted below. It is also understood that aspects of the couplings 10, 110 may be substituted for one another or used in conjunction with one another where applicable.

The threaded coupling 110 includes a body portion 112 of a fluid conduit 114 having an internal fluid passage 116. The threaded coupling 110 also includes threads 118 and an axially forward sealing surface 120. The threaded coupling 110 also includes an interference member 122 disposed on the body portion 112. The interference member 122 is engageable with a portion of another fluid conduit 124 to apply a load on the interference member 122 when the fluid conduits 114, 124 are threadably connected together. The interference member 122 is configured to prevent a complete sealing engagement between the fluid conduits 114, 124 when the load on the interference member 122 is less than a predefined amount, and is configured to allow the complete sealing engagement between the fluid conduits 114, 124 when the load on the interference member 22 meets or exceeds the predetermined amount.

In the illustrated embodiment, the body portion 112 is a portion of a fitting that forms at least a portion of the fluid conduit 114. The fitting (also referred to with reference numeral 114) may be any suitable fitting. The sealing surface 120 includes a seal 126, such as an elastomeric seal, disposed in an annular groove in an end face of the body portion 112. The threads 118 of the fitting are radially outward threads that are configured to threadably couple with an internal thread of a coupling nut 134 for forceably drawing a sealing surface of the other fluid conduit 124 into sealing engagement with the sealing surface 120 of the fitting 114.

The interference member 122 is movable relative to the body portion 112 when the load on the interference member 122 meets or exceeds the predefined amount. The interference member 122 includes, or forms, an axially forwardly protruding abutment that protrudes forwardly of the sealing surface 120 when the load on the abutment is below the predefined amount, and when the load on the abutment meets or exceeds the predefined amount, the abutment is moved axially rearwardly of the sealing surface 120.

In the illustrated embodiment, the interference member 122 includes one or more pins 140 disposed in axial slots 142 in the body portion 112 of the coupling 110. The one or more pins 140 are axially movable within the axial slots 142. The pins 140 are circumferentially spaced apart to provide a leak path when the load is below the predefined amount and the threaded coupling 110 is in an incomplete connection state.

In exemplary embodiments, the interference member 122 (e.g., pins 140) is frictionally held to the body portion 112, such as by the radially inward walls of the slots 142. When the load on the interference member 122 meets or exceeds the predefined amount, a friction force between the interference member 122 and the body portion 112 is overcome to allow the interference member 122 to move relative to the body portion 112, thus allowing the complete sealing engagement between the fluid conduits 114, 124. In the illustrated embodiment, the interference member 122 (e.g., pins 140) is disposed within the body portion 112 (e.g., slots 142) with an interference fit, and the movement of the pins 140 relative to the body portion 112 causes elastic and/or plastic deformation of the body portion 112 at the slots 142.

In the illustrated embodiment, the nut 134 may be threaded onto the fitting 114 such that the pins 140 engage a forward portion of the other fluid conduit 124, however the seal 126 does not engage, or is not compressed sufficiently, to provide a seal-tight engagement with the conduit 124. During hand-tightening of the nut 134, the pins 140 will not move by very much, if at all, thereby preventing the other fluid conduit 124 from being fully drawn into a seal-tight engagement with the fitting 114. Thus, when fluid pressure is applied to the coupling joint in the hand-tight state, the connection will intentionally begin to leak. The circumferentially spaced apart pins 140 may further ensure such leakage by providing leak paths across the engagement of the pins 140 with the other fluid conduit 124.

In the illustrated embodiment, during torqueing of the nut 134, such as with a wrench or other tool, an axial component of force is applied to the pins 140. When the axial force overcomes the friction force holding the pins 140, or the force for causing elastic and/or plastic deformation of the body portion 112 at the slots 142, the pins 140 will begin to move axially rearwardly within the slots 142. When the pins 140 are moved by a predetermined amount (e.g., sufficiently rearward of the sealings surface 120) in response to the axial load applied, the sealing surface of the other conduit 124 makes a complete sealing engagement with the sealing surface 120 of the coupling 110 (e.g., via sufficient compression of the elastomeric seal 126 in the fitting 114).

In alternative embodiments, the pins 140 may be coupled to the forward face of the nut 134 instead of the body portion 112 in a similar manner. Such a configuration would prevent the nut 134 from fully engaging the radially outward shoulder portion 137 of tube end portion 136 (which may be a sleeve or formed from the tube). This, in turn, would prevent the tube end portion 136 from making the complete connection until fully-torqued.

Figure 5:
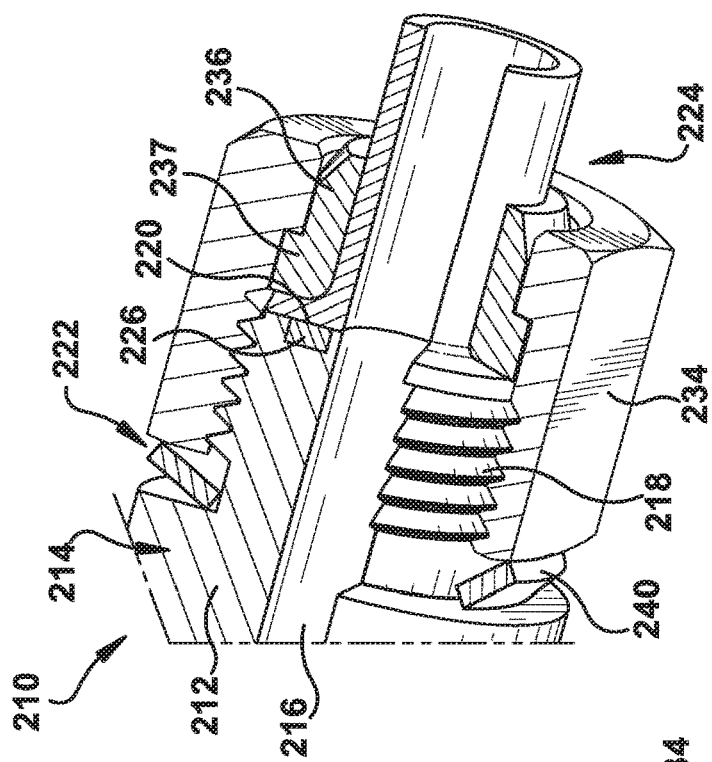
FIG. 5 is a cross-sectional perspective view of at least a portion of another exemplary threaded coupling according to another embodiment of the invention, which is shown connected another fluid conduit.

Referring to FIG. 5, another exemplary threaded coupling 210 is shown. The coupling 210 is substantially similar to the above-referenced coupling 10, and consequently the same reference numerals but indexed by 200 are used to denote structures corresponding to similar structures in the couplings. In addition, the foregoing description of the structures and operation of the couplings 10, 110 are equally applicable to the coupling 210 except as noted below. It is also understood that aspects of the couplings 10, 110, 210 may be substituted for one another or used in conjunction with one another where applicable.

The threaded coupling 210 includes a body portion 212 of a fluid conduit 214 having an internal fluid passage 216. The threaded coupling 210 also includes threads 218 and an axially forward sealing surface 220. The threaded coupling 210 also includes an interference member 222 disposed on the body portion 212. The interference member 222 is engageable with a portion of another fluid conduit 224 to apply a load on the interference member 222 when the fluid conduits 214, 224 are threadably connected together. The interference member 222 is configured to prevent a complete sealing engagement between the fluid conduits 214, 224 when the load on the interference member 222 is less than a predefined amount, and is configured to allow the complete sealing engagement between the fluid conduits 214, 224 when the load on the interference member 222 meets or exceeds the predetermined amount.

In the illustrated embodiment, the body portion 212 is a portion of a fitting that forms at least a portion of the fluid conduit 214. The fitting (also referred to with reference numeral 214) may be any suitable fitting. The sealing surface 220 includes a seal 226, such as an elastomeric seal, disposed in an annular groove in an end face of the body portion 212. The threads 218 of the fitting are radially outward threads that are configured to threadably couple with an internal thread of a coupling nut 234 for forceably drawing a sealing surface of the other fluid conduit 224 into sealing engagement with the sealing surface 220 of the fitting 214.

The interference member 222 is movable relative to the body portion 212 when the load on the interference member 222 meets or exceeds the predefined amount. The interference member 222 may include, or form, an axially forwardly protruding abutment that protrudes forwardly of the sealing surface 220 when the load on the abutment is below the predefined amount, and when the load on the abutment meets or exceeds the predefined amount, the abutment is moved axially rearwardly of the sealing surface 220. Alternatively, as shown in the illustrated embodiment, the interference member 222 may be located axially rearwardly of the sealing surface 220, such as proximal a rearward portion of the threads 218, to thereby engage the nut 334.

In the illustrated embodiment, the interference member 222 includes a biasing member 240, such as a Belleville washer (e.g., coned-disc spring, conical spring washer, or spring washer), a wave spring, coil spring, or polyurethane material. The biasing member 240 may be fixedly attached or otherwise operatively coupled to the body portion 212 in any suitable manner. The biasing member 240 (e.g., spring washer) is configured to axially deflect (e.g., flatten) by a predetermined amount in response to a predetermined amount of axial load on the biasing member 240. In this manner, the biasing member 240 is designed to provide a spring load that is equivalent to the desired tightness force required to make a complete (e.g., leak-free) connection between the fluid conduit members 214, 224. Accordingly, when the load on the biasing member 240 meets or exceeds the predefined amount, a spring force of the biasing member 240 is overcome to allow the interference member 222 (e.g., spring washer 240) to move relative to the body portion 212 to allow the complete sealing engagement between the fluid conduits 214, 224. The biasing member 240 may be specifically designed and/or calibrated for each coupling 210 type, size, operational conditions, etc., so as to consistently provide the load required to make the complete connection.

In the illustrated embodiment, the nut 234 may be threaded onto the fitting 214 such that the biasing member 240 engages the nut 234, or a forward portion of the other fluid conduit 224, however the seal 226 does not engage, or is not compressed sufficiently, to provide a seal-tight engagement with the conduit 224. During hand-tightening of the nut 234, the biasing member 240 will not move by very much, if at all, thereby preventing the other fluid conduit 224 from being fully drawn into a seal-tight engagement with the fitting 214. Thus, when fluid pressure is applied to the coupling joint in the hand-tight state, the connection will intentionally begin to leak.

In the illustrated embodiment, during torqueing of the nut 234, such as with a wrench or other tool, an axial component of force is applied to the biasing member 240. When the axial force overcomes a spring force of the biasing member 240, the biasing member 240 will begin to move axially rearwardly. When the biasing member 240 is deflected (e.g., flattened) by a predetermined amount (e.g., sufficiently rearward of the sealings surface 220) in response to the axial load applied, the sealing surface of the other conduit 224 makes a complete sealing engagement with the sealing surface 220 of the coupling 210 (e.g., via sufficient compression of the elastomeric seal 226 in the fitting 214).

In alternative embodiments, the interference member 222 could be located between the nut 234 and the radially outward shoulder 237 of the tube end portion 236 (which may be a sleeve attached to a tube or formed from the tube). The operation of the interference member 222 at this location would be essentially the same as described above.

In alternative embodiments, the interference member 222 could be configured to break and/or collapse when torqued beyond a predetermined load, but is strong enough to prevent such collapse and/or breakage during hand-tightening. Such an interference member 222 could be made of a frangible material, such as a plastic.

Figure 6:
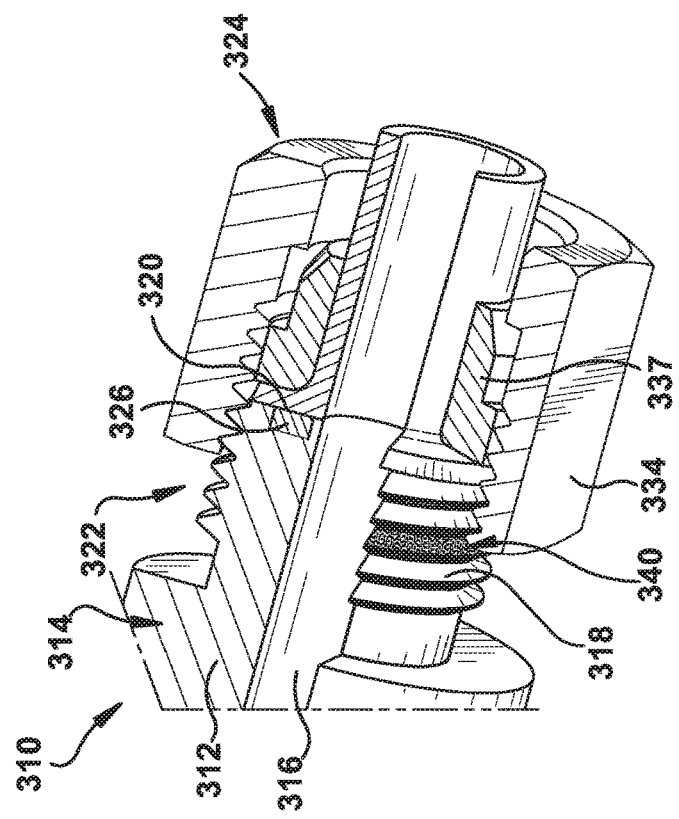
FIG. 6 is a cross-sectional perspective view of at least a portion of another exemplary threaded coupling according to another embodiment of the invention, which is shown connected another fluid conduit.

Referring to FIG. 6, another exemplary threaded coupling 310 is shown. The coupling 310 is similar to the above-referenced coupling 10, and consequently the same reference numerals but indexed by 300 are used to denote structures corresponding to similar structures in the couplings. In addition, the foregoing description of the structures and operation of the couplings 10, 110, 210 are equally applicable to the coupling 310 except as noted below. It is also understood that aspects of the couplings 10, 110, 210, 310 may be substituted for one another or used in conjunction with one another where applicable.

The threaded coupling 310 includes a body portion 312 of a fluid conduit 314 having an internal fluid passage 316. The threaded coupling 310 also includes threads 318 and an axially forward sealing surface 320. The threaded coupling 310 also includes an interference member 322 disposed on the body portion 312. The interference member 322 is engageable with a portion of another fluid conduit 324 to apply a load on the interference member 322 when the fluid conduits 314, 324 are threadably connected together. The interference member 322 is configured to prevent a complete sealing engagement between the fluid conduits 314, 324 when the load on the interference member 322 is less than a predefined amount, and is configured to allow the complete sealing engagement between the fluid conduits 314, 324 when the load on the interference member 322 meets or exceeds the predetermined amount.

In the illustrated embodiment, the body portion 312 is a portion of a fitting that forms at least a portion of the fluid conduit 314. The fitting (also referred to with reference numeral 314) may be any suitable fitting. The sealing surface 320 includes a seal 326, such as an elastomeric seal, disposed in an annular groove in an end face of the body portion 312. The threads 318 of the fitting are radially outward threads that are configured to threadably couple with an internal thread of a coupling nut 334 for forceably drawing a sealing surface of the other fluid conduit 324 into sealing engagement with the sealing surface 320 of the fitting 314.

In the illustrated embodiment, the interference member 322 includes a stop 340 on the threads 318. The stop 340 may be a hardened polymeric material applied to the threads 318. The stop 340 may be a hardened adhesive, a heat-shrink sleeve, or tape configured such that it is too difficult to hand-tighten beyond the stop 340, but would allow tightening beyond the stop 340 when applying the proper torque. The nut 334 of the conduit 324 may be threaded onto the threads 318, such that the internal threads of the nut 334 engage the stop 340. During hand-tightening of the nut 334, the stop (e.g., polymeric material) 340 will not move by very much, if at all, thereby preventing the other fluid conduit 324 from being fully drawn into a seal-tight engagement with the fitting 314. Thus, when fluid pressure is applied to the coupling joint in the hand-tight state, the connection will intentionally begin to leak.

In the illustrated embodiment, during torqueing of the nut 334, such as with a wrench or other tool, a force is applied to the stop 340. When the shear force overcomes a strength of the stop 340, the stop will displace (e.g., break apart) from the threads 318. This allows the nut 334 to complete the threading onto threads 318 to allow the sealing surface of the conduit 324 to makes a complete sealing engagement with the sealing surface 320 of the coupling 310.

In alternative embodiments, the stop 340 could be applied to the internal threads of the nut 334 instead of the threads 318 of the fitting 314.

In other alternative embodiments, the stop 340 could be an insert, such as a plastic insert, in the nut 334 (similar to nylon-insert locknuts) that is difficult to tighten by hand, but could be tightened with a torque tool.

In other embodiments, the stop 340 could be a ring, such as an O-ring or split ring, which may be made of an elastomeric or plastic material, which is inserted into an O-ring groove formed in the region of the threads 318. The ring would be configured to prevent hand-tightening beyond the ring, but would allow proper tightening and a complete connection when proper torque is applied such as with a tool.

In alternative embodiments, the ring (e.g., O-ring) could be placed at location 337 between the nut 334 and shoulder of tube end portion of the conduit 324. The ring would be configured to prevent hand-tightening, but would squeeze out of location 337 when proper torque is applied such as with a tool.

Figure 7:
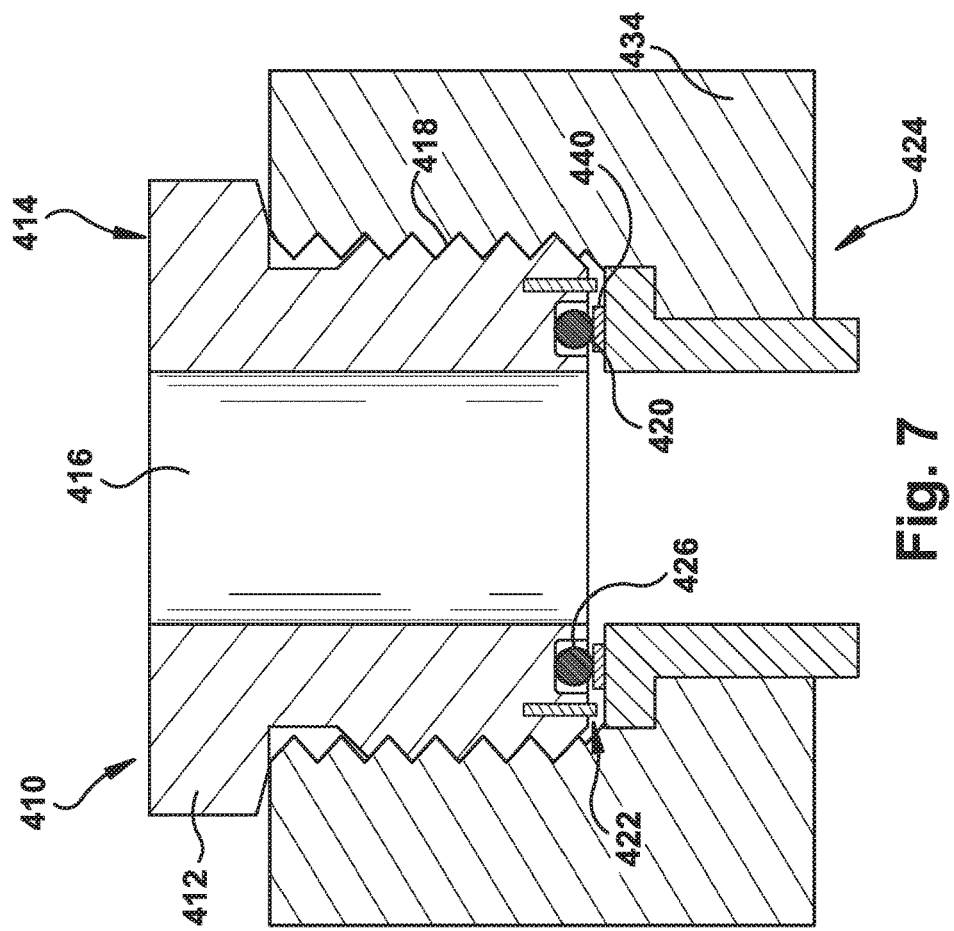
FIG. 7 is a cross-sectional side view of at least a portion of another exemplary threaded coupling according to another embodiment of the invention, which is shown connected another fluid conduit.

Referring to FIG. 7, another exemplary threaded coupling 410 is shown. The coupling 410 is similar to the above-referenced coupling 10, and consequently the same reference numerals but indexed by 400 are used to denote structures corresponding to similar structures in the couplings. In addition, the foregoing description of the structures and operation of the couplings 10, 110, 210, 310 are equally applicable to the coupling 410 except as noted below. It is also understood that aspects of the couplings 10, 110, 210, 310, 410 may be substituted for one another or used in conjunction with one another where applicable.

The threaded coupling 410 includes a body portion 412 of a fluid conduit 414 having an internal fluid passage 416. The threaded coupling 410 also includes threads 418 and an axially forward sealing surface 420. The threaded coupling 410 also includes an interference member 422 operatively coupled to the body portion 412. The interference member 422 is engageable with a portion of another fluid conduit 424 to apply a load on the interference member 422 when the fluid conduits 414, 424 are threadably connected together. The interference member 422 is configured to prevent a complete sealing engagement between the fluid conduits 414, 424 when the load on the interference member 422 is less than a predefined amount, and is configured to allow the complete sealing engagement between the fluid conduits 414, 424 when the load on the interference member 422 meets or exceeds the predetermined amount.

In the illustrated embodiment, the body portion 412 is a portion of a fitting that forms at least a portion of the fluid conduit 414. The fitting (also referred to with reference numeral 414) may be any suitable fitting. The sealing surface 420 includes a seal 426, such as an elastomeric seal, disposed in an annular groove in an end face of the body portion 412. The threads 418 of the fitting are radially outward threads that are configured to threadably couple with an internal thread of a coupling nut 434 for forceably drawing a sealing surface of the other fluid conduit 424 into sealing engagement with the sealing surface 420 of the fitting 414.

In the illustrated embodiment, the interference member 422 includes a pressure sensitive material 440 which may be applied to the sealing surface 420. The pressure sensitive material 440 is configured to change state, or dissolve, when the load on the pressure sensitive material 440 meets or exceeds the predefined amount. In this manner, during hand-tightening of the nut 434, the pressure sensitive material 440 will not remain in its original state, thereby preventing the other fluid conduit 424 from sealingly engaging the sealing surface 420 of the fitting 414. Thus, when fluid pressure is applied to the coupling joint in the hand-tight state, the connection will intentionally begin to leak.

In the illustrated embodiment, during torqueing of the nut 434, such as with a wrench or other tool, a force, such as an axial force, is applied to the pressure sensitive material 440. When the force exceeds the predefined amount, the pressure sensitive material will change state, or dissolve. This allows the sealing surface of the other conduit 424 to make a complete sealing engagement with the sealing surface 420 of the coupling 410.

While exemplary forms of the coupling 10, 110, 210, 310, 410 have been described above, it should be apparent to those having ordinary skill in the art that features of each of these alternative forms may be used in conjunction with one another, or other alternative configurations also could be employed. For example, although the coupling 10, 110, 210, 310, 410 has been described above as forming a fitting, the features also could be employed to the other fluid conduit (e.g., 24, 124, 224, 324, 424) having the tube end instead. In this manner, the body portion of the coupling would be the tube end of the fluid conduit, the threaded coupling further including the nut rotatable about the tube end, wherein the sealing surface includes a portion of the tube end, and wherein the threads are radially inward threads of the nut. The interference member 22, 122, 222, 322, 422 could be operatively coupled to the tube end, the nut, or any other portion of the fluid conduit 24-424. It is also noted that the tube end of the fluid conduit 24-424 may be formed from an end portion of a tube, or may be a sleeve that is attached to the tube.

According to an aspect, a threaded coupling for ensuring a complete connection between fluid conduits, includes: a body portion of a fluid conduit, an axially forward sealing surface, and a thread; and an interference member operatively coupled to the body portion, the interference member being engageable with a portion of another fluid conduit to apply a load on the interference member when the fluid conduits are threadably connected together; wherein the interference member is configured to prevent a complete sealing engagement between the fluid conduits when the load on the interference member is less than a predefined amount; and wherein the interference member is configured to allow the complete sealing engagement between the fluid conduits when the load on the interference member meets or exceeds the predetermined amount.

Embodiments may include one or more of the following additional features, alone or in any combination.

In some embodiments, the interference member is movable relative to the body portion when the load on the interference member meets or exceeds the predefined amount.

In some embodiments, the interference member includes an axially forwardly protruding abutment that protrudes forwardly of the sealing surface when the load on the abutment is below the predefined amount, and wherein the abutment is moved axially rearwardly of the sealing surface when the load on the abutment meets or exceeds the predefined amount.

In some embodiments, the interference member is frictionally held to the body portion, and wherein when the load on the interference member meets or exceeds the predefined amount, a friction force between the interference member and the body portion is overcome to allow the interference member to move relative to the body portion by a sufficient amount to allow the complete sealing engagement between the fluid conduits.

In some embodiments, the interference member is disposed within the body portion with an interference fit, and wherein movement of the interference member relative to the body portion causes elastic and/or plastic deformation of the body portion by the interference member.

In some embodiments, the interference member includes an annular sleeve.

In some embodiments, the annular sleeve is disposed in an internal fluid passage of the body portion of the fluid conduit.

In some embodiments, the internal fluid passage includes a radially enlarged forward portion having an axial stop surface, the annular sleeve being disposed in the radially enlarged forward portion.

In some embodiments, the annular sleeve includes a plurality of circumferentially spaced apart gaps that provide a leak path when the load is below the predefined amount and the threaded coupling is in an incomplete connection state.

In some embodiments, the annular sleeve has a crenulated forward surface.

In some embodiments, the interference member includes one or more pins disposed in axial slots in the body portion, wherein the one or more pins are axially movable within the axial slots.

In some embodiments, the one or more pins includes a plurality of pins circumferentially spaced apart to provide a leak path when the load is below the predefined amount and the threaded coupling is in an incomplete connection state.

In some embodiments, the interference member includes a biasing member that is biased away from the threaded coupling making the complete connection, and wherein when the load on the biasing member meets or exceeds the predefined amount, a spring force of the biasing member is overcome to allow the interference member to move relative to the body portion by a sufficient amount to allow the complete sealing engagement between the fluid conduits.

In some embodiments, the biasing member includes a spring washer that is configured to deflect by a predetermined amount in response to the amount of load.

In some embodiments, the interference member includes a stop on the threads, and wherein when the load on the stop meets or exceeds the predefined amount, a shear force displaces the stop from the threads by a sufficient amount, thereby allowing the complete sealing engagement between the fluid conduits.

In some embodiments, the interference member includes a pressure sensitive material, wherein the pressure sensitive material dissolves when the load on the pressure sensitive material meets or exceeds the predefined amount.

In some embodiments, the sealing surface includes a seal disposed in an annular groove in an end face of the body portion.

In some embodiments, the body portion is a body portion of a fitting that forms at least a portion of the fluid conduit, and wherein the threads are radially outward threads of the fitting.

In some embodiments, the fitting is configured to threadably couple via the external thread with an internal thread of a coupling nut disposed on a tube end of the other fluid conduit for forceably drawing the tube end toward the fitting for securing the tube end to the fitting in a sealing relationship via the sealing surface of the fitting and a corresponding sealing surface of the tube end.

In some embodiments, the body portion is a tube end of the fluid conduit, the threaded coupling further including a nut rotatable about the tube end, wherein the sealing surface includes a portion of the tube end, and wherein the threads are radially inward threads of the nut.

Terms such as "top," "bottom," "upper," "lower," "left," "right," "front," "rear," "forward," "rearward," and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

As used herein, an "operable connection," or a connection by which entities are "operably connected," is one in which the entities are connected in such a way that the entities may perform as intended. An operable connection may be a direct connection or an indirect connection in which an intermediate entity or entities cooperate or otherwise are part of the connection or are in between the operably connected entities.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments.

What is claimed is:

1. A threaded coupling for ensuring a complete connection between fluid conduits, comprising:
   a body portion of a fluid conduit, an axially forward sealing surface, and a thread; and
   an interference member operatively coupled to the body portion, the interference member being engageable with a portion of another fluid conduit to apply a load on the interference member when the fluid conduits are threadably connected together;
   wherein the interference member is configured to prevent a complete sealing engagement between the fluid conduits when the load on the interference member is less than a predefined amount; and
   wherein the interference member is configured to allow the complete sealing engagement between the fluid conduits when the load on the interference member meets or exceeds the predetermined amount;
   wherein the interference member includes a stop on the threads, and wherein when the load on the stop meets or exceeds the predefined amount, the load on the stop fractures the stop and displaces the stop from the threads, thereby allowing the complete sealing engagement between the fluid conduits.

2. The threaded coupling according to claim 1, wherein the sealing surface includes a seal disposed in an annular groove in an end face of the body portion.

3. The threaded coupling according to claim 1, wherein the body portion is a body portion of a fitting that forms at least a portion of the fluid conduit, and wherein the threads are radially outward threads of the fitting.

4. The threaded coupling according to claim 3, wherein the fitting is configured to threadably couple via the external thread with an internal thread of a coupling nut disposed on a tube end of the other fluid conduit for forceably drawing the tube end toward the fitting for securing the tube end to the fitting in a sealing relationship via the sealing surface of the fitting and a corresponding sealing surface of the tube end.

5. The threaded coupling according to claim 1, wherein the body portion is a tube end of the fluid conduit, the threaded coupling further including a nut rotatable about the tube end, wherein the sealing surface includes a portion of the tube end, and wherein the threads are radially inward threads of the nut.

6. The threaded coupling according to claim 1, wherein the stop is a hardened polymeric material applied to the threads.

7. A threaded coupling for ensuring a complete connection between fluid conduits, comprising:
   a body portion of a fluid conduit, an axially forward sealing surface, and a thread; and
   an interference member operatively coupled to the body portion, the interference member being engageable with a portion of another fluid conduit to apply a load on the interference member when the fluid conduits are threadably connected together;
   wherein the interference member is configured to prevent a complete sealing engagement between the fluid conduits when the load on the interference member is less than a predefined amount; and
   wherein the interference member is configured to allow the complete sealing engagement between the fluid conduits when the load on the interference member meets or exceeds the predetermined amount;
   wherein the interference member includes a stop ring made of an elastomeric or plastic material, which is disposed in a groove formed in the region of the threads, wherein when the load on the stop ring meets or exceeds the predefined amount, a force displaces the stop ring from the groove, thereby allowing the complete sealing engagement between the fluid conduits.

8. The threaded coupling according to claim 7, wherein the sealing surface includes a seal disposed in an annular groove in an end face of the body portion.

9. The threaded coupling according to claim 7, wherein the body portion is a body portion of a fitting that forms at least a portion of the fluid conduit, and wherein the threads are radially outward threads of the fitting.

10. The threaded coupling according to claim 9, wherein the fitting is configured to threadably couple via the external thread with an internal thread of a coupling nut disposed on a tube end of the other fluid conduit for forceably drawing the tube end toward the fitting for securing the tube end to the fitting in a sealing relationship via the sealing surface of the fitting and a corresponding sealing surface of the tube end.

11. The threaded coupling according to claim 7, wherein the body portion is a tube end of the fluid conduit, the threaded coupling further including a nut rotatable about the tube end, wherein the sealing surface includes a portion of the tube end, and wherein the threads are radially inward threads of the nut.

* * * * *